United States Patent
Rouyer et al.

(10) Patent No.: US 6,622,964 B2
(45) Date of Patent: Sep. 23, 2003

(54) SYSTEM FOR THE SYNCHRONIZED LOCKING OF THE DOORS OF A THRUST REVERSER

(75) Inventors: Pascal Gérard Rouyer, Saint-Aubin Routot (FR); Patrick Gonidec, Montvilliers (FR)

(73) Assignee: Hurel Hispano-le-Havre, Gonfreville l'Orcher (FR)

(*) Notice: Subject to any disclaimer, the term of this patent is extended or adjusted under 35 U.S.C. 154(b) by 0 days.

(21) Appl. No.: 10/114,055

(22) Filed: Apr. 3, 2002

(65) Prior Publication Data

US 2002/0145078 A1 Oct. 10, 2002

(30) Foreign Application Priority Data

Apr. 5, 2001 (FR) .............................. 0104625

(51) Int. Cl.[7] ................................. F02K 1/32
(52) U.S. Cl. .............. 244/110 B; 60/226.2; 239/265.19
(58) Field of Search ...................... 244/110 B; 60/226.2, 60/230; 239/265.19, 265.29

(56) References Cited

U.S. PATENT DOCUMENTS 4,212,442 A * 7/1980 Fage ...................... 244/110 B
5,775,639 A * 7/1998 Fage ...................... 244/110 B
5,953,904 A * 9/1999 Mountney ................ 60/226.2
5,987,880 A * 11/1999 Culbertson ................ 60/204
6,487,845 B1 * 12/2002 Modglin et al. ........... 60/226.2

* cited by examiner

Primary Examiner—Robert P. Swiatek
(74) Attorney, Agent, or Firm—Oblon, Spivak, McClelland, Maier & Neustadt, P.C.

(57) ABSTRACT

In a turbojet thrust reverser comprising, in an annular section of an outer cowling of the turbojet, a number of movable doors which, in an inactive position during operation in a forward thrust configuration, close off passages separating rigid spars of a fixed structure, there is provided, between two adjacent doors, a locking system which allows substantially simultaneous opening of the two doors. The locking system comprises, for each door, at least one hook mounted on the fixed structure so that it can be pivoted by an olive secured to the door between a door locking position and an unlocked position during opening or closing movement of the door. The two hooks of the locking system are rotationally interlinked by a mechanical linkage device, for example link rods, so as to prevent the unlocking of one door if the other door is closed.

14 Claims, 9 Drawing Sheets

SYSTEM FOR THE SYNCHRONIZED LOCKING OF THE DOORS OF A THRUST REVERSER

BACKGROUND OF INVENTION

1. Field of the Invention

The invention relates to a thrust reverser device for a bypass turbojet.

More particularly the invention relates to a turbojet thrust reverser comprising, in an annular section of an outer cowling surrounding a gas ejection duct, a fixed structure comprising longitudinal spars delimiting passages between them, and a plurality of movable doors which, in an inactive position during operation of the turbojet in forward thrust, close off said passages and constitute part of the outer cowling and which, in a reverse thrust configuration, at least partially close off the ejection duct and deflect a gaseous jet toward the passages.

The doors are moved by control means consisting, for example, of rams supported by a rigid front frame situated upstream of the passages. The doors are generally mounted, in an intermediate region of their side walls, by pivots to the spars. In the reverse thrust configuration, the doors pivot in such a way that a part of the doors situated downstream of the pivots more or less completely closes off the bypass or cold stream and in such a way that an upstream part of the doors uncovers the passages in the outer cowling so as to allow the bypass stream to be routed radially with respect to the axis of the turbojet.

The upstream part of the doors projects out from the outer cowling for reasons of sizing of the passage which has to be capable of allowing this stream to pass through without compromising engine operation. The angle of pivoting of the doors is adjusted so as to allow the stream to pass and in such a way as to destroy the thrust of this stream, or even to begin to generate backthrust by creating a component of the stream deflected in the upstream direction.

The role of the thrust reverser in reverse thrust mode is to create reverse thrust which slows down the aircraft particularly when it is running along a runway after landing.

It is therefore essential that the doors be kept in the inactive or closed position during flight. This is why systems are provided for locking the doors in the closed position.

2. Summary of the Prior Art

In the event of an engine disk shattering, the reverser may sustain serious damage. In the (albeit unlikely) event of this happening, the reverser must not, in spite of this, deploy to the reverse thrust configuration. To achieve this objective, it is possible to use lateral locks usually fitted into the fixed structure of the reverser and situated at a longitudinal position remote from another door-locking system so that the debris of a disk cannot simultaneously hit both reverser door locking systems.

Reverser safety with regard to inadvertent deployment may be enhanced generally, and not just for the eventuality of the shattering of an engine disk, by adding a third lock which may lessen the effect of failure of the other locking systems if necessary. This addition enhances the reliability of the locking systems. Now, in the current state of the art, this lock is equipped with a control system more or less independent of that of the other locking systems. This lock generates an increase in mass and, to a certain extent, a reduction in the reliability of the control system.

The philosophy behind improving the resistance to shattered engines consists in securing as many moving parts of the reverser as possible. It is therefore highly advantageous to synchronize the opening of two doors of a door-type thrust reverser, because the probability of damaging the members that retain each of two doors in the event of a breakage is far lower than the possibility of breaking the locking system for just one door.

One possible solution consists in synchronizing the moving parts of the reverser, to give a mechanical line of defense independent of the reverser control system. However, the devices for synchronizing the doors are generally heavy. These are often ram synchronizing screws, whose reliability as locking members is sometimes debatable.

Finally, it is extremely tricky to synchronize the doors via their pivots, because of the significant torques generated by the pressure forces to which they are subjected.

SUMMARY OF THE INVENTION

The object of the invention is to provide a thrust reverser as defined in the introduction and in which the doors are held in the closed position if an engine shatters or if there is complete failure of the locking system of one door.

Another object of the invention is to provide a thrust reverser which comprises a passive locking system, the operation of which is based on synchronizing the opening of two doors of the thrust reverser, without any external control member.

Accordingly the invention provides a thrust reverser for a turbojet having an outer cowling surrounding a gas ejection duct, said thrust reverser comprising a fixed structure including longitudinal spars delimiting passages between said spars in an annular section of said cowling, and a plurality of doors mounted to move between an inactive position occupied during forward thrust operation of said turbojet wherein said doors close off said passages and constitute part of said outer cowling, and a reverse thrust position wherein said doors at least partially close off said ejection duct and deflect the gaseous jet toward said passages, wherein there is provided, between two adjacent doors of said thrust reverser, a locking system allowing substantially simultaneous opening of said two doors, said locking system comprising, for each of said two doors, at least one hook mounted on said fixed structure so that it can pivot between a door locking position and an unlocked position, at least one olive secured to each of said two doors for engaging and pivoting said hooks during opening or closing movement of said doors, and a mechanical linkage device rotationally interconnecting the hooks of said two doors so as to prevent the unlocking of one door if the other door is closed.

The following advantageous provisions are also adopted:
  each hook comprises an olive housing delimited by a lower internal profile and an upper internal profile, said internal profile being configured in such a way that said lower internal profile is constantly in the path of the corresponding olive and said upper internal profile can move out of said path, and in such a way that said olive exerts a locking torque when it presses against said lower internal profile and exerts an unlocking torque when it presses against said upper internal profile;
  each hook is urged toward said unlocked position by resilient means;
  said unlocked position of said hook is defined by a stop; and
  said olive is mounted on a retractable support so as to allow non-simultaneous closure of said two doors, this support being urged toward an active position of said olive by resilient means.

According to a first embodiment of the invention, said hooks are mounted so that they can pivot about pivot pins substantially parallel to the axis of rotation of the turbojet.

The mechanical linkage device may consist of two intermeshed toothed sectors, formed respectively in peripheral walls of said hooks and centered on said pivot pins.

The mechanical linkage device may comprise a link rod articulated at each end to a respective one of said hooks by means of a ball-type joint.

As a preference, the mechanical linkage device comprises at least two link rods, each link rod being articulated in the manner of a ball joint to a respective hook by one of its ends and being connected slidingly to the other hook by the other end so that said link rods work mainly in tension.

According to a second embodiment of the invention, each hook is mounted so that it can pivot about the axis of a transmission shaft substantially parallel to the pivot pin of the corresponding door. The mechanical linkage device transmits torque between said two transmission shafts, and is, for example, of the cardan type.

According to an alternative form of this second embodiment, each hook is mounted so that it can pivot about a transmission shaft parallel to the pivot pin of the corresponding door, which shaft is rotationally linked to a transmission shaft of a control latch associated with the other door, said control latch being capable of being driven in rotation between a locked position and an unlocked position by a second olive with which the other door is equipped. Each hook comprises an upper internal profile preventing said hook from rotating when said olive is pressing against said profile as a consequence of premature opening of said door.

DESCRIPTION OF THE PREFERRED EMBODIMENTS

Figure 1:
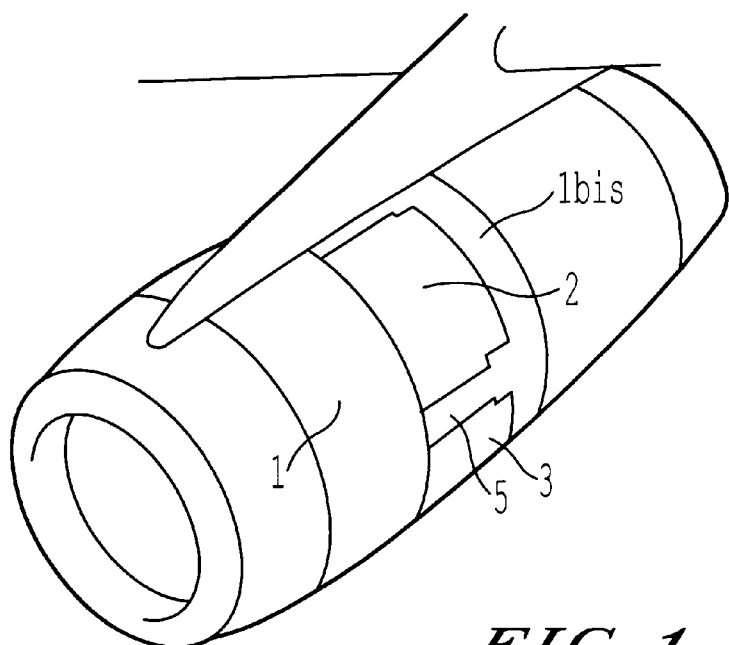
FIG. 1 is a perspective view of a turbojet engine comprising a thrust reverser with doors in a closed position.
Figure 2:
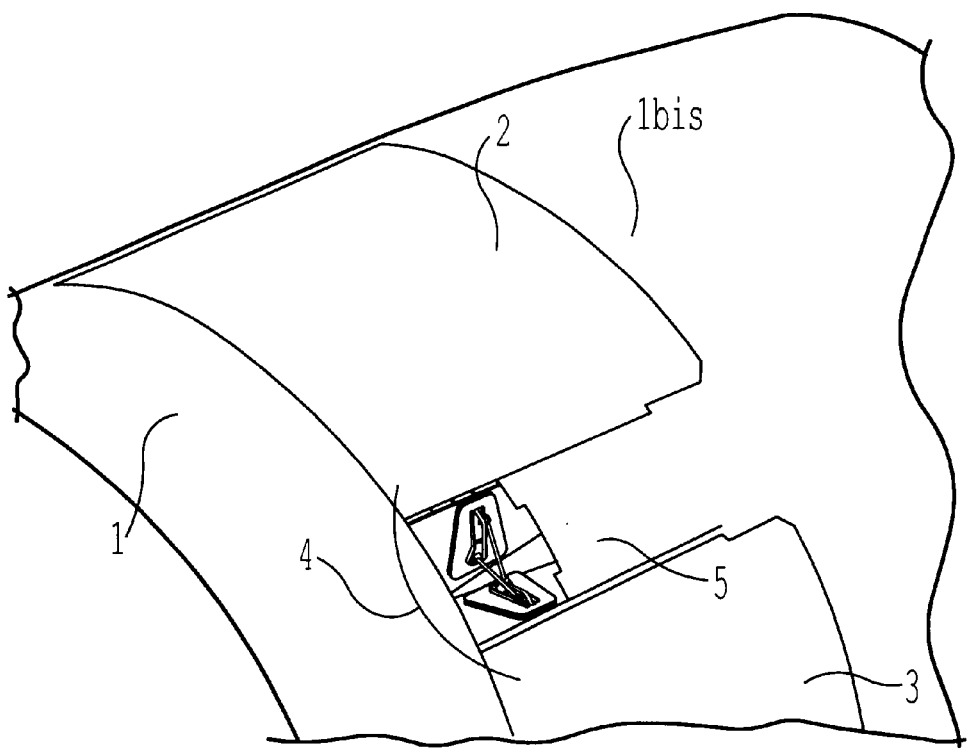
FIG. 2 depicts a perspective part view of one embodiment of a locking system of the invention in a passive locked position, in which system locking is synchronized by link rods.
Figure 3:
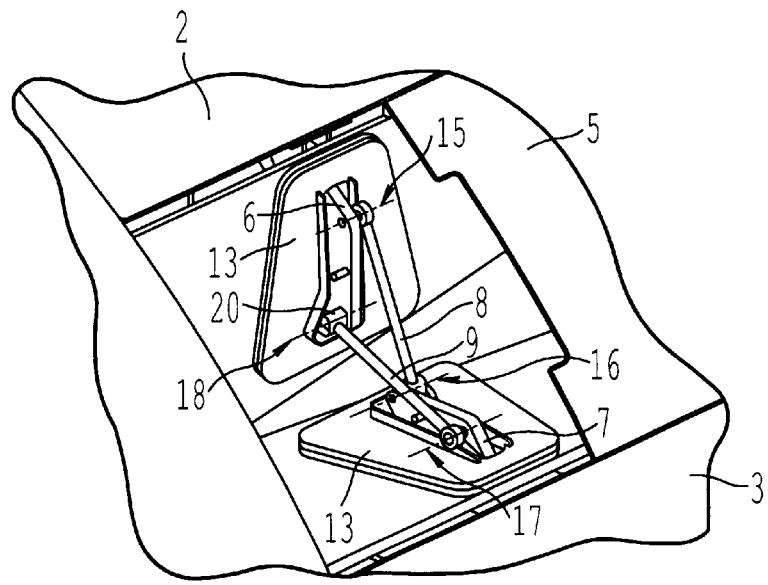
FIG. 3 depicts, on a larger scale, a detail of the locking system of FIG. 2.

A system for the synchronized locking of the doors of a thrust reverser is installed on a fixed structure 1 and 1b is of the reverser, in an integration region 5 commonly known as a spar, situated between two doors which are identified differently for clarity, as door 2 and door 3. With the same objective of clarity, the upper part of the spar 5 situated above the locking system 4 is omitted from the perspective views. The locking synchronization system is made up of at least two hooks connected to one another by a mechanical linkage member, which slaves the opening of one of the hooks to the opening of the door of the other hook.

According to a first embodiment depicted in FIGS. 2 to 10, the locking synchronization system 4 is made up of at least two hooks 6 and 7 which can move in rotation about their respective pins 12 secured to mounting plates 13 fixed to side walls of the spar 5, their rotation being in a plane identical to or close to a plane perpendicular to the longitudinal axis of the engine.

Figure 5:
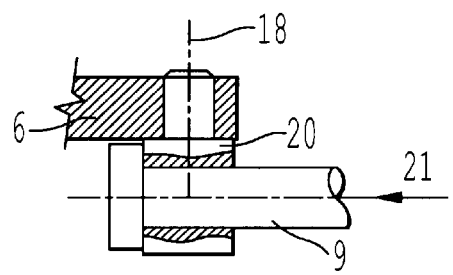
FIG. 5 partially depicts a section on a plane through V—V of FIG. 4.
Figure 6:
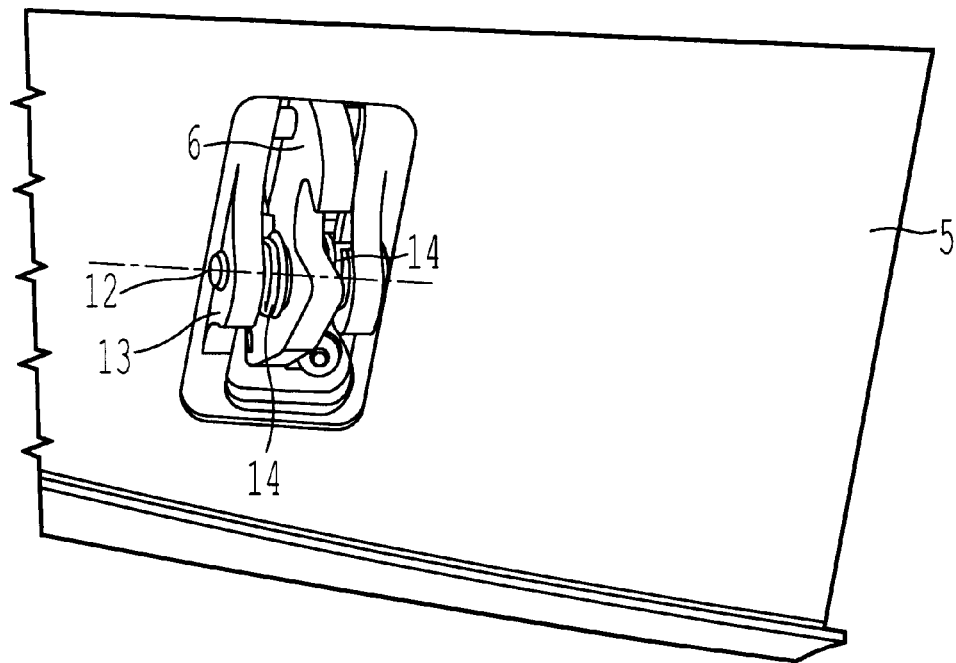
FIG. 6 depicts a partial detail, in perspective, showing the fitting into a spar of a mounting plate with a locking hook equipped with a return system.

The hooks 6 and 7 are joined together by at least two link rods 8 and 9 which slave the opening of one of the hooks to the opening of the door of the other hook, these link rods being situated in two different planes which may or may not be mutually parallel. The link rod 8 is connected to the hook 6 at an axis 15 and to the hook 7 at an axis 16, the link rod 9 being connected to the hook 7 at an axis 17 and to the hook 6 at an axis 18. It will be noted that the connection of the link rod 9 to the hook 7 is achieved at the axis 17 by a link of the pivot or ball-joint type, and that its connection to the opposite hook 6, shown in detail in FIG. 5, is achieved by means of an intermediate pin 20, mounted so that it can pivot about the axis 18 and secured to the hook 6, the link between the pin 20 and the link rod 9 being of the sliding pivot or slide type, allowing relative movement between these two elements in a direction 21, parallel to the link rod 9, which can occur during the dynamics of opening or of closing the hooks. This particular device also allows the link rod to be worked mainly in tension and to avoid any risk of buckling. The links described in respect of the link rod 9 are identical on the link rod 8. Moreover, it is possible to design a system equipped with just one link rod, ball-jointed at both ends, able to work both in compression and in tension.

It is also possible to design a system devoid of link rods, in which system each hook 6 and 7 has a toothed sector in a region of its profile opposite to the profile that provides locking. These two toothed sectors mesh with one another, thus driving and synchronizing said hooks.

Figure 4:
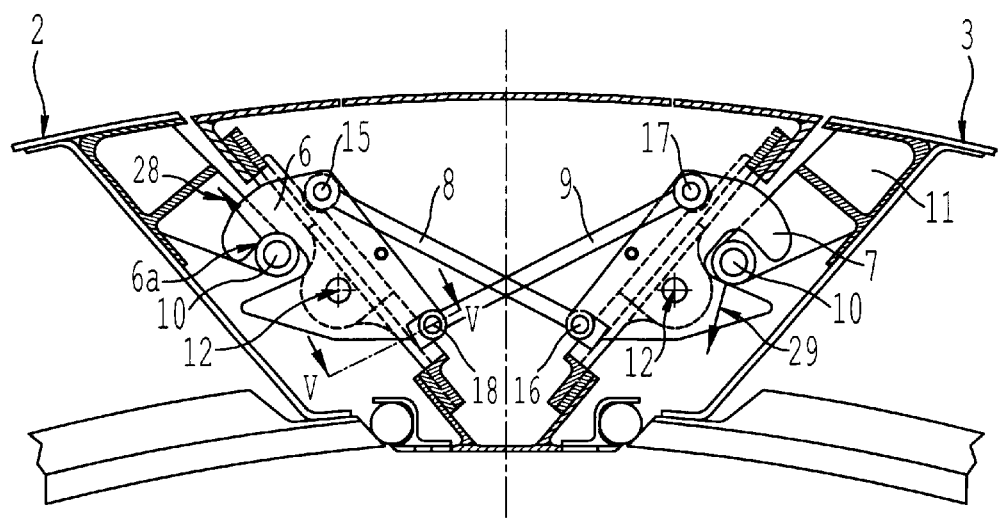
FIG. 4 depicts a view, in section on a plane perpendicular to the engine axis, of the locking system of FIGS. 2 and 3, in an active locked position, following non-simultaneous opening or an attempt at the deployment of just one door.

As shown in FIG. 4, the doors 2 and 3 each have, on their lateral walls contiguous with the spar 5, a fitting 11 equipped with an olive 10. In the event of an attempted inadvertent deployment of just one door, in this instance the door 2, this olive 10 comes into contact with an upper internal profile 6a of the hook 6, the action 28 creating a moment that tends to cause said hook 6 to pivot about the pin 12 towards the inside of the spar 5, thus placing the link rod 9 in tension between its attachment points 17 and 18. Since the door 3 is locked, the action 29 of the olive 10 associated with it on a lower internal profile 7b of the hook 7 keeps the latter in the closed position. The result of this is that the hook 6 is also immobilized in terms of rotation about its pin 12, thereby keeping the door 2 in a position close to its closed position, which is satisfactory from a safety point of view.

Figure 7:
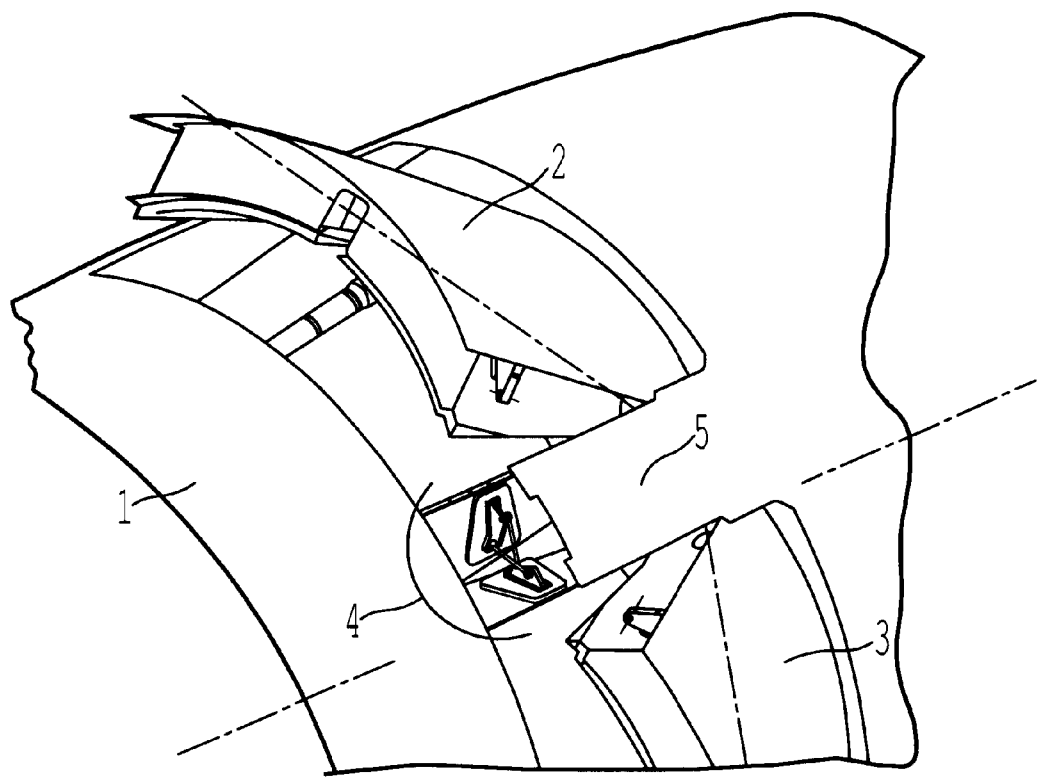
FIG. 7 corresponds FIG. 2, but shows the locking system in an unlocked position, the two doors opening practically simultaneously.
Figure 8:
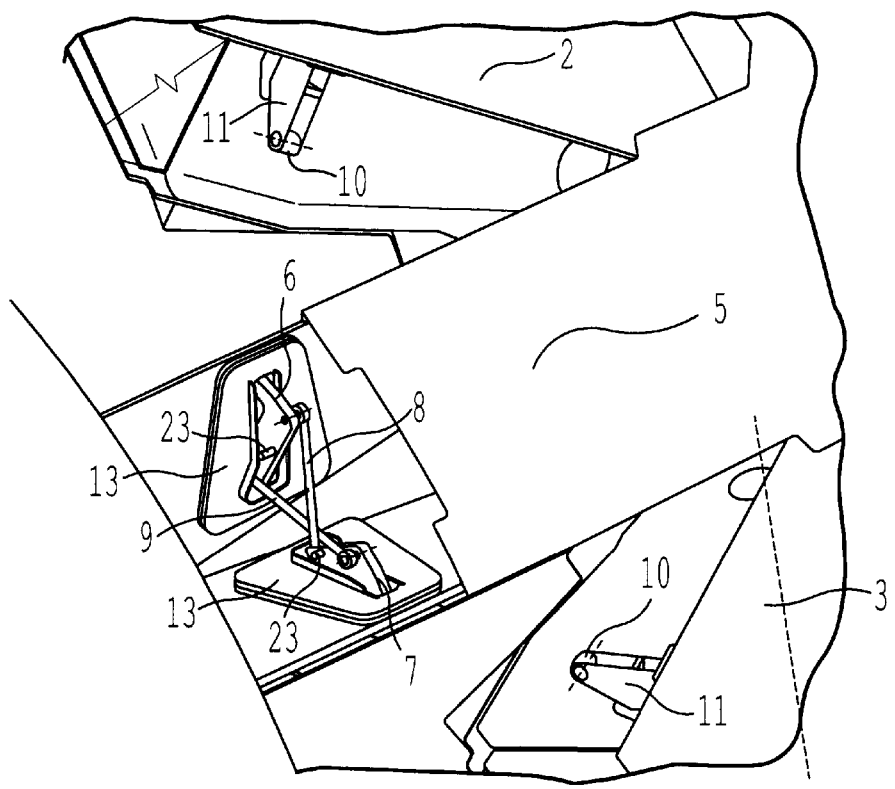
FIG. 8 depicts, on a larger scale, a detail of the locking system of FIG. 7.
Figure 9:
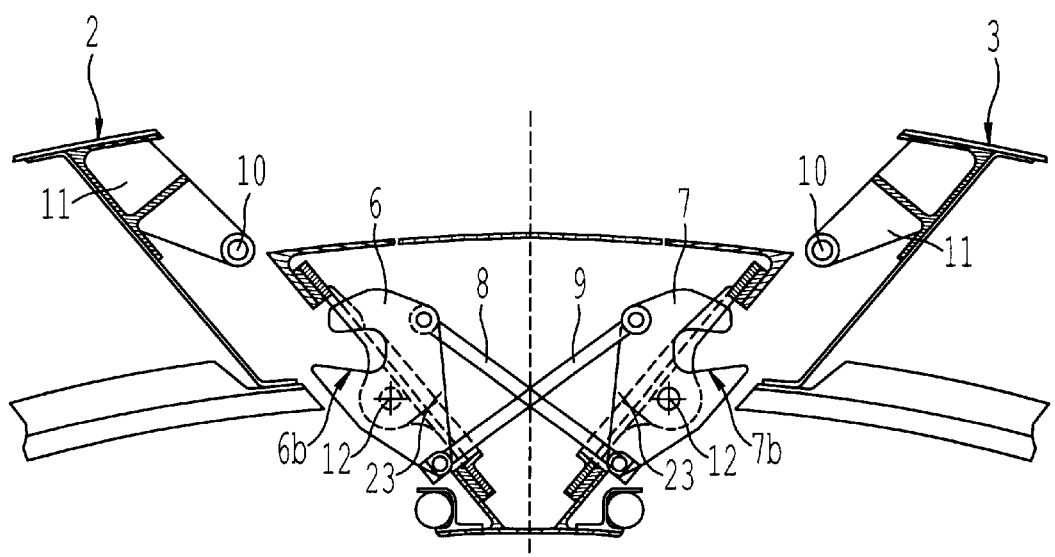
FIG. 9 depicts a view, in section on a plane perpendicular to the engine axis, of the locking system of FIGS. 7 and 8.

FIGS. 7, 8 and 9 show that in the event of practically simultaneous opening of the two doors 2, 3, during reverse thrust operation, the two hooks 6 and 7 each pivot about their pin 12 and place themselves in a position that allows the two doors 2, 3 to open fully. This adoption of position may be initiated by one or other of the two olives 10 or by both simultaneously. One or more return systems, such as a torsion spring 14 for example, coaxial with the pin 12 depicted in FIG. 6 facilitates the opening of hooks 6 and 7, and keeps the latter in a standby position such that their respective lower internal profiles 6b and 7b guarantee, under the action of the olives 10 during re-closure of the doors, that the locking system 4 will automatically go into a passive locked position. Each hook 6, 7 is equipped with a fixed or adjustable stop 23 limiting its rotation toward the inside of the spar 5 to the standby position. Significant desynchronization of the re-closure of the doors 2, 3 may lead to it being impossible for the lagging door to lock again, its olive 10 coming into abutment with an external profile 6c of the hook associated with it.

Figure 10A:
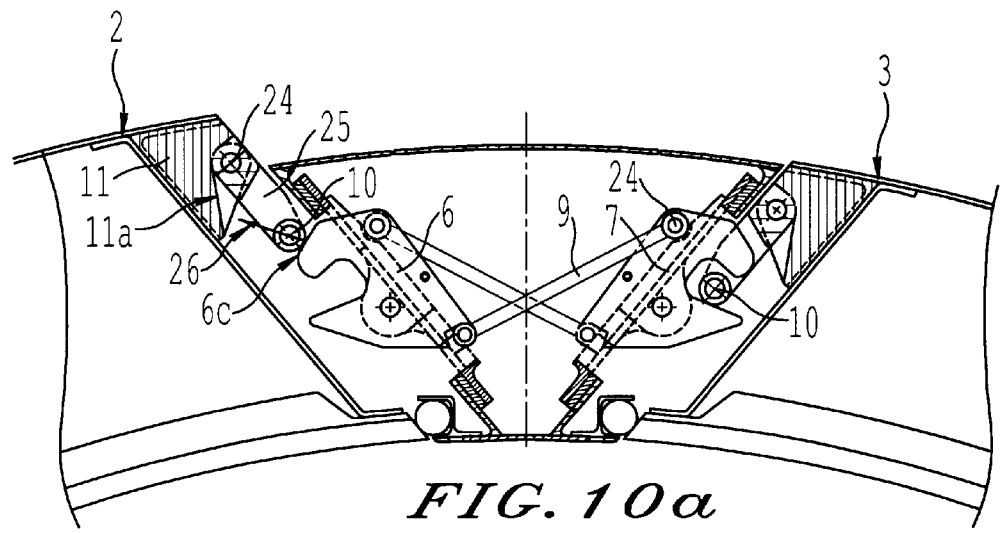
FIGS. 10a, 10b and 10c depict, in a view identical to FIG. 4, in three positions, a retractable olive support which allows non-simultaneous closure of the two doors.
Figure 10B:
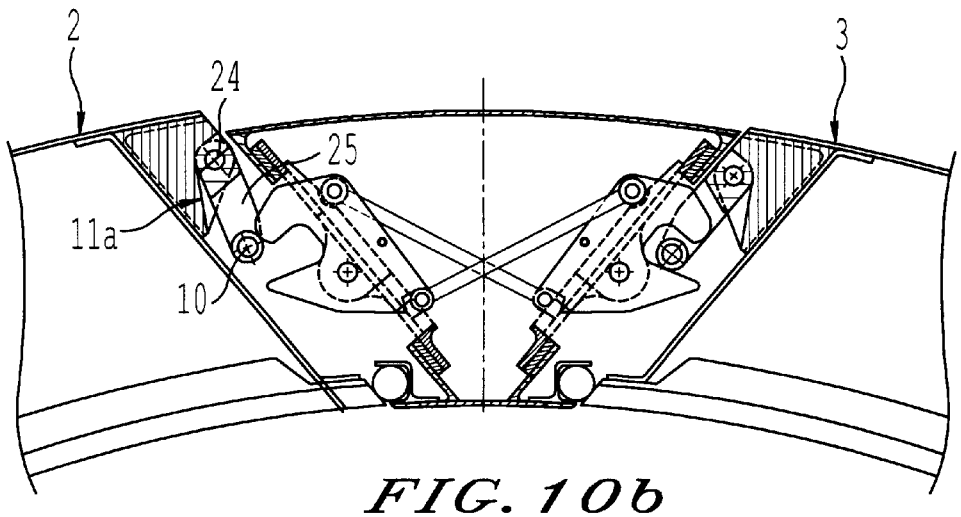
Figure 10C:
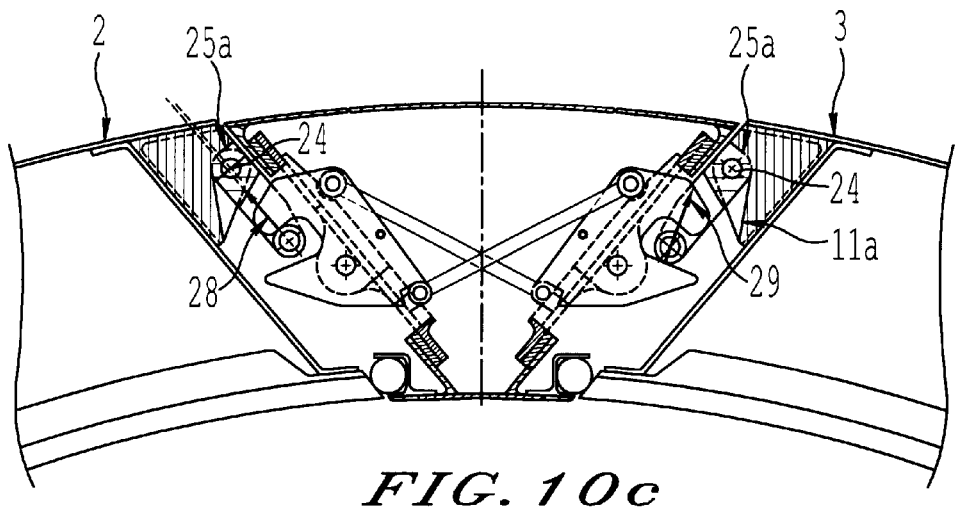

FIGS. 10a, 10b and 10c represent a retractable olive support 25 allowing non-simultaneous closure of the two doors. In FIG. 10a, with the door 3 in the closed position, the olive 10 of the door 2 comes into contact with the external profile 6c of the hook 6, the latter being already in the passive locked position, and kept in this position by the link rod 9. The support 25, articulated about a longitudinal pin 24 secured to the fitting 11, pivots towards the inside of the door 2 under a force 26, resulting from the contact between the olive 10 and the external profile 6c, until the door 2 is allowed to close as shown in FIG. 10b. It may be sensible to combine the rotation of the support 25 with a position sensor which will make it possible to detect excessive desynchronization of closure and thus identify certain failures in the door activation system (such as a leaky ram). This could, for example, be combined with a stop 25a on the support 25.

In the event of an attempt at deploying just one door (FIG. 10c), the position of the resultant of a retaining force 28 with respect to the pin 24 is such that the support 25 tends to pivot towards the outside of the door, thus making the locking self-closing. The same is true of the resultant of the contact 29 of the olive 10 with the lower internal profile 7b but, as excessive rotation of the support 25 could be detrimental to the entire locking system, the associating of its external profile with an appropriate internal profile 11a of the fitting 11 limits this rotation. It should be noted that a return system, not depicted, such as a torsion spring for example, coaxial with the pin 24, keeps the support 25 in a position that makes it possible both to avoid any risk of interference with the spar 5 and also to retain the olive 10 with the internal profiles of the hooks 6, 7. The stop 25a may also be replaced by a double-acting spring which places the olive 10 in a position suited to its engagement during normal locking thereof by contact with the profile 6b, while at the same time allowing it to engage correctly in the hook 6, during desynchronized locking of the doors by contact with the profile 6c, so as to cause the force 29 to pass correctly from the olive 18 to the lock when immobilizing the corresponding door.

It will also be noted that other principles of retraction known to those skilled in the art may be envisioned, such as, for example, a support 25 for an olive 10 retracting by rotation about a vertical axis parallel to the side walls of the door or, alternatively, by replacing the support 25 and the olive 10 with a hook pivoting about an axis normal to the side walls of the doors.

According to a second embodiment depicted in FIGS. 11 to 15, the locking synchronization system 4 is made up of at least two hooks 6 and 7 equipped with respective transmission shafts 30 and 31. Each assembly 6, 30 and 7, 31 is mounted so that it is free to rotate about its respective axis 32 in bearings formed by the mounting plates 33 used for incorporating the whole of the locking system 4 into the side walls of the spar 5, rotation of said assemblies being in a plane substantially parallel to a side wall of their respective doors. It should be noted that each assembly comprising a hook 6, 7 plus shaft 30, 31 may comprise a one-piece unit.

Figure 11:
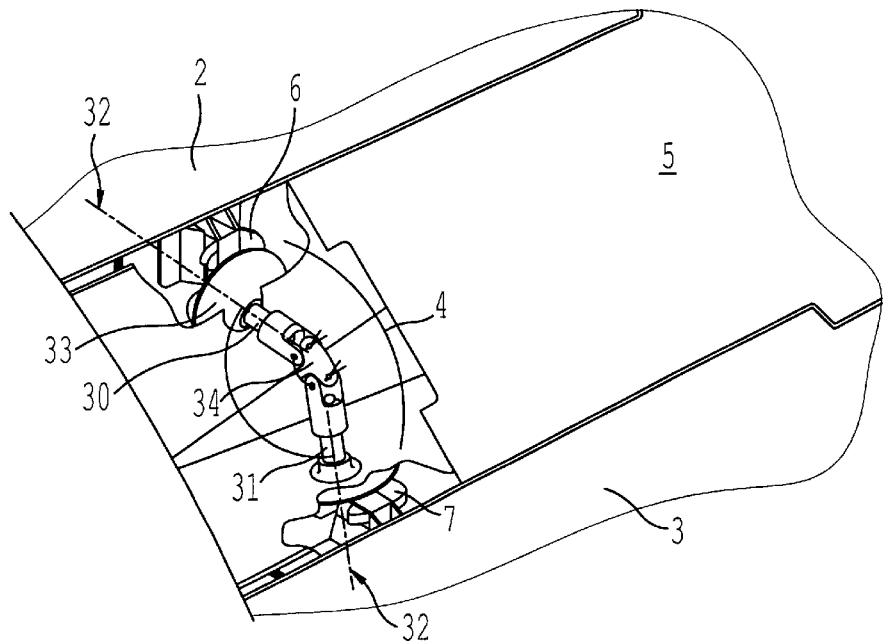
FIG. 11 depicts, in a view analogous to that of FIG. 3, a locking system according a second embodiment of the invention, in a locked position, in which locking is synchronized by transmitting torque and in which a locking hook is naturally self-opening.
Figure 13:
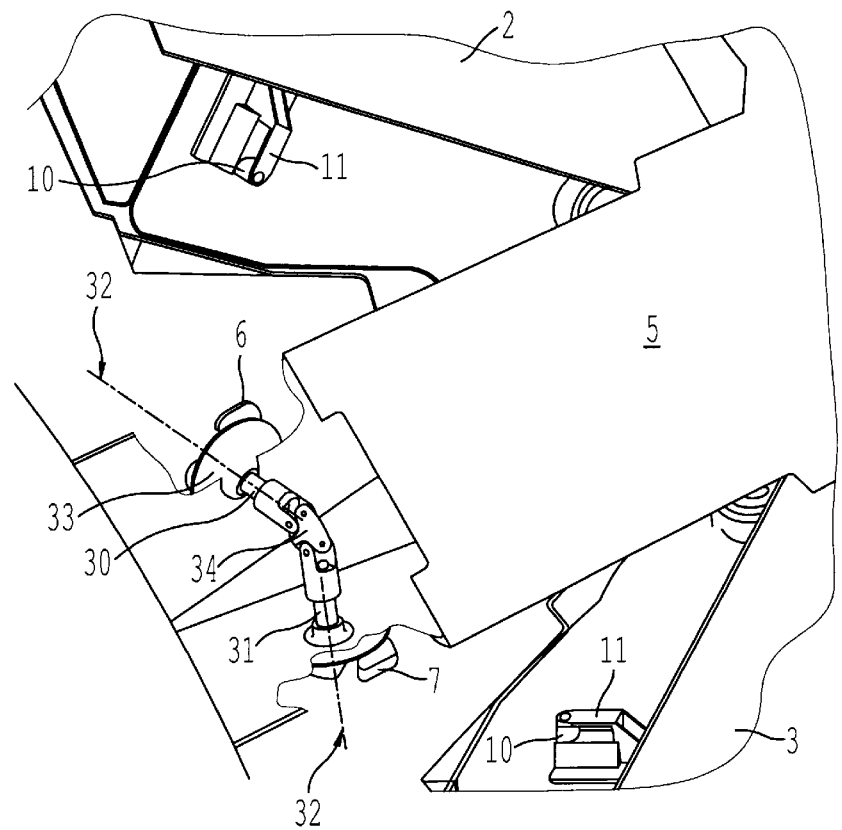
FIG. 13 corresponds to FIG. 11, but shows the locking system in an unlocked position.

A mechanical linking member 34, generally situated inside the spar 5, transmits torque between the shafts 30 and 31. The link 34 may be of the cardan type as depicted in FIGS. 11 and 13, but it is possible to envision a transmission of the bevel gear type, or any other mechanical transmission that is satisfactory in terms of synchronization and of transmission of torque, known to those skilled in the art.

Figure 12:
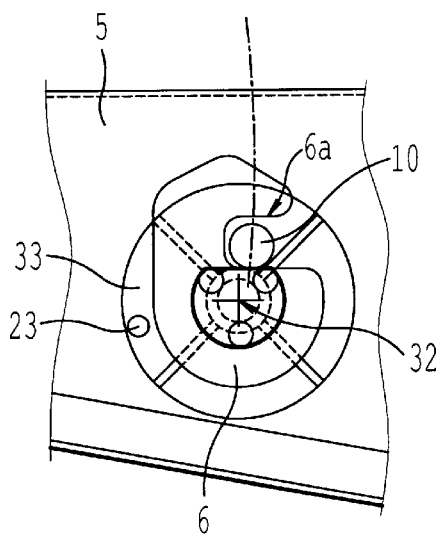
FIG. 12 depicts, in a direction parallel to the axis of rotation of the hook, a part view of the second embodiment of FIG. 11.

FIG. 12 depicts the hook 6 and the olive 10 which are associated with the door 2 in a passive locked position, the hook 7 and the olive 10 associated with the door 3 (none shown) occupying an identical position. In an attempt at the deployment of just one door, for example the door 2, its olive 10 comes into contact with the upper internal profile 6a of said hook 6, creating a torque tending to open the lock by rotating the hook 6 and shaft 30 assembly about the axis 32. This torque is transmitted in full via the link 34 to the shaft 31 and to the hook 7. The door 3, being kept closed and locked by its primary and/or secondary locking members, prevents this by creating, through contact of its olive 10 with the lower internal profile 7b of the hook 7 associated with it, a torque that opposes the previous one, thus preventing the hook 6 from rotating and therefore preventing the door 2 from deploying.

Figure 14:
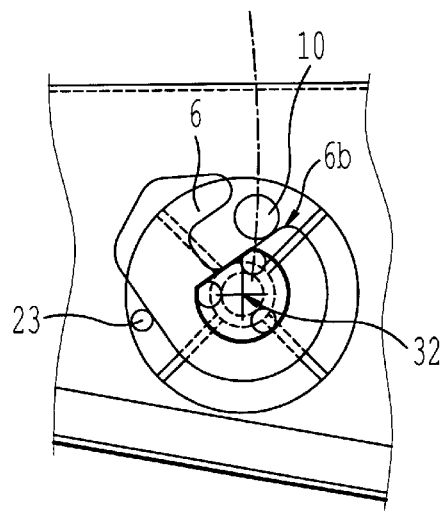
FIG. 14 corresponds to FIG. 12, but shows the locking system in the unlocked position.
Figure 15A:
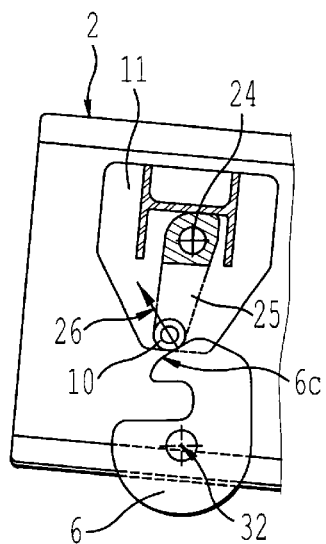
FIGS. 15a, 15b and 15c depict, in a sectional view normal to a side wall of the door, in three positions, a retractable olive support which allows non-simultaneous closure of the two doors.
Figure 15B:
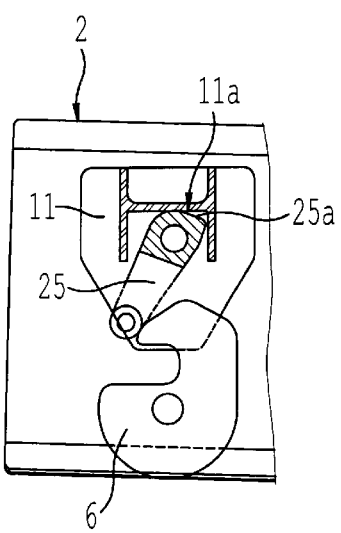
Figure 15C:
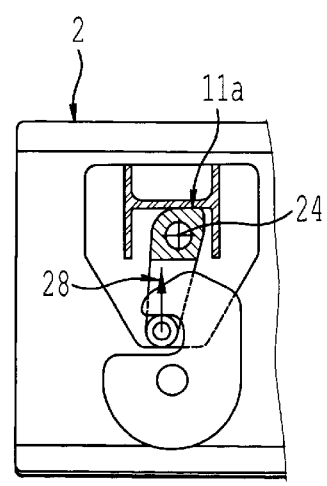

During substantially simultaneous opening of the two doors 2, 3 during the thrust-reversal phase, the two hooks 6 and 7 each pivot about their axes 32 and place themselves in a position that allows the two doors 2, 3 to open fully, as shown in FIG. 14. This adoption of position may be initiated by one or other of the two olives 10 or by both simultaneously. One or more return systems, not depicted, facilitate the opening of the hooks 6 and 7, and keep the latter in a standby position such that their respective lower internal profiles 6b and 7b, under the action of the olives 10 during the re-closure of the doors, automatically places the locking system in the passive locked position. At least one of the two mounting plates 33 has a fixed or adjustable stop 23 limiting the opening of the hooks 6, 7 to the standby position (FIG. 14). FIGS. 15(a), (b) and (c) depict a retractable olive support 25 analogous to the one described previously in FIGS. 10(a), (b) and (c), the pin 24 in this case being perpendicular to the side walls of the door, the rotation of the lever 25 about this pin being towards the front or rear of the door 2, 3.

It should be noted that the direction of rotation for the opening of the hooks 6 and 7 may, with equal preference, be toward the front or toward the rear of the doors 2, 3.

It will also be noted that it is possible to install the whole of the synchronized locking system 4 in the fixed structure of the reverser situated upstream of the doors 2 and 3, it being possible in this case for the fittings 11 to be installed with equal preference either on the side walls or front walls of the doors, the hooks 6 and 7 then opening from the upstream to the downstream direction.

FIGS. 16, 17, 18a–18d, and 19a–19c depict an alternative form of the embodiment described previously, in which the retaining hooks 6 and 7 have an upper internal profile 6a and 7a preventing these hooks from rotating in the event of contact 28 with the olive 10 and making said hooks 6 and 7 self-closing.

To allow the doors 2 and 3 to be opened in normal reverse-thrust operation, it is essential that the hooks 6 and 7 be able to be placed in a position that allows the passage of the olive 10 situated facing them. As this position cannot be achieved by contact with the olive 10 on the upper internal profiles 6a and 7a, each of the two hooks 6 and 7 equipped with its respective transmission shaft 30 and 31 is associated via a mechanical linkage 34 with a control latch 36, 37, also provided with a transmission shaft 38, 39.

Figure 16:
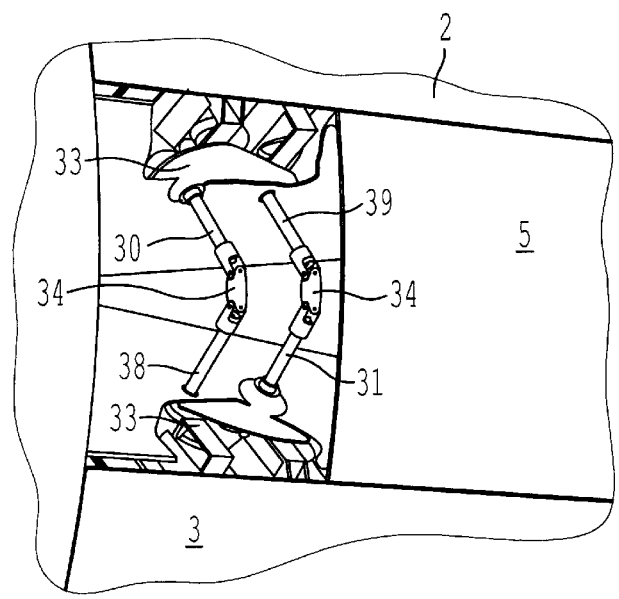
FIG. 16 depicts, in a view analogous to that of FIG. 11, an alternative form of the second embodiment of the invention, in a locked position, in which locking is synchronized by transmitting torque and in which a locking hook is naturally self-closing.
Figure 17:
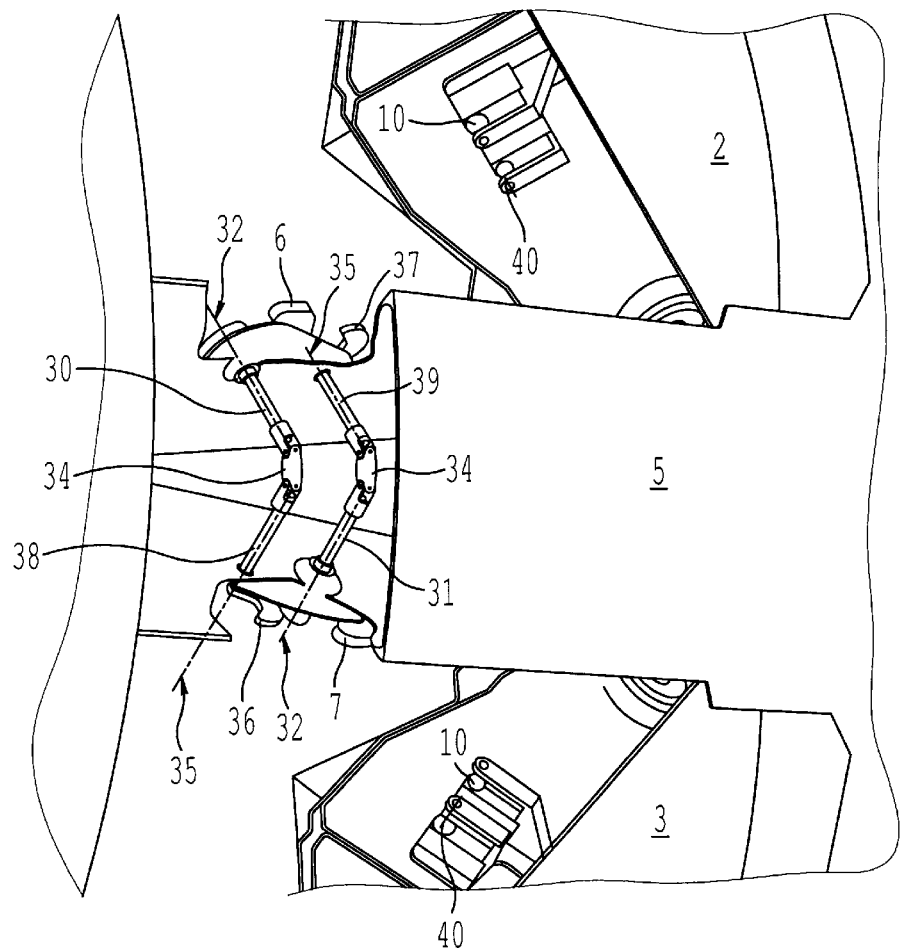
FIG. 17 depicts, in a view analogous to that of FIG. 13, the alternative form of the second embodiment of FIG. 16, in an unlocked position.

As FIGS. 16 and 17 show, the hook 6 equipped with its shaft 30 is connected to the latch 36 equipped with its shaft 38, while the hook 7 equipped with its shaft 31 is connected to the latch 37 equipped with its shaft 39, the opening of the latches 36 and 37 being controlled by their respective olive 40 located on the doors 2, 3 near the locking olives 10.

Figure 18A:
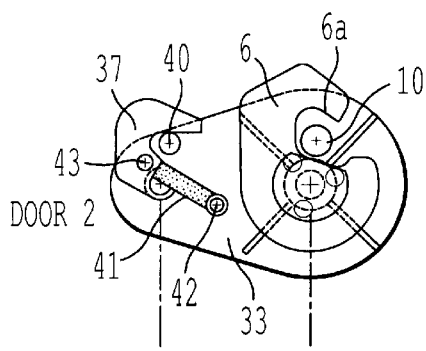
FIGS. 18a–18d simultaneously depict, schematically, in a direction parallel to the axes of rotation of the locking hooks, the locking systems of two linked doors, in a passive locked position (see FIGS. 18a and 18c) and in an active locked position (see FIGS. 18b and 18d) following non-simultaneous opening or an attempt at the deployment of just one door.
Figure 18B:
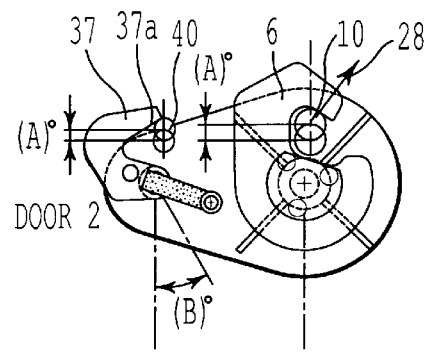
Figure 18C:
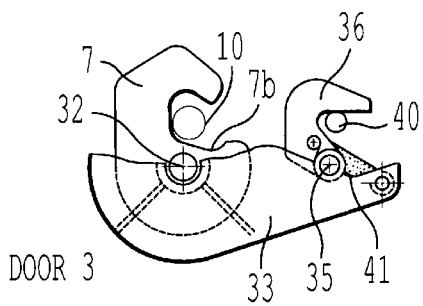
Figure 18D:
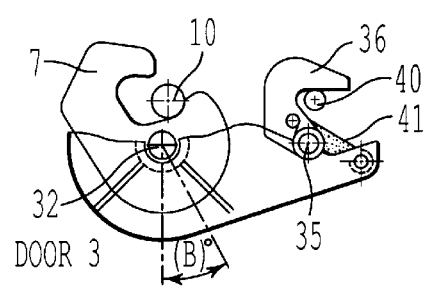

FIGS. 18a–18d schematically depict the slaving of the opening of a hook 7 to the opening of the door 2 associated with the other hook 6. FIGS. 18a and 18c depict the doors 2 and 3, respectively, in the closed position, each olive 40 being in contact with the internal profile 36a or 37a of the control latch 36,37 associated with it. As FIGS. 18b and 18b show, in the event at an attempted inadvertent deployment of just one door, in this instance the door 2, the olives 40 and 10 associated with this door 2 move through the same angle A until the olive 10 comes into contact 28 with the upper internal profile 6a of the hook 6, thus aborting the attempted deployment.

While the angular travel A of the olive 10 gives rise to no significant movement of the hook 6, the same angular travel of the olive 40 causes the latch 36 to rotate through an angle B, which is wholly transmitted by the link 34 to the hook 7 mounted opposite on the door 3, the latter door being in the same closed position in FIG. 18(a) FIGS. 18a and 18c. An appropriate design of the lower internal profile 7b and 6b of the hooks 6 and 7 allows this angle of travel B, so as to guarantee that the forces retaining the door 2 are taken up only by the hook 6, or the forces retaining the door 3 are taken up only by the hook 7. As a result, in this embodiment, as the forces induced in the hooks 6 and 7 are transmitted directly to the fixed structure of the reverser, the torques transmitted through the links 34 are not very high, which means that it is possible to use components of small cross section, something which is always advantageous from the mass point of view.

Each latch 36 and 37 is connected to at least one return system which may, as depicted in FIGS. 18a–18d and 19a–19c, consist of a tension spring 41, one of the ends of which is secured to the mounting plate 33 at a point 42, its opposite end being secured to a latch at a point 43. The points 42 and 43 are sited with respect to the axis of rotation 35 of the latches 36, 37 in such a way that during the dynamics of opening or closing said latches 36 and 37, the return moment generated by each spring 41 is reversed. Return systems effecting identical operation may also be installed on the hooks 6 and 7.

Figure 19A:
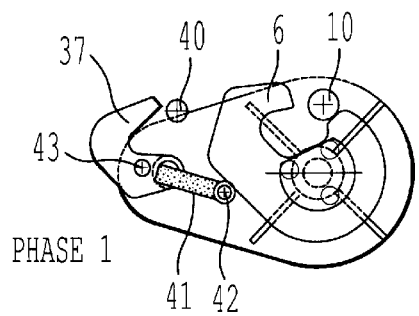
FIGS. 19a–19c depict, in a direction parallel to the axis of rotation of a hook, three steps in placing the locking members in the locked position during simultaneous closure of the doors.
Figure 19B:
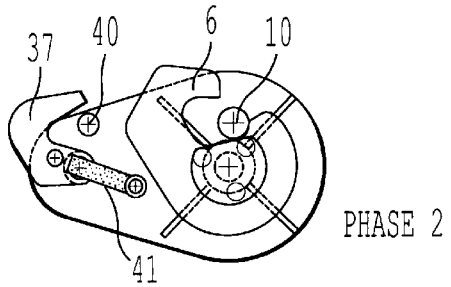
Figure 19C:
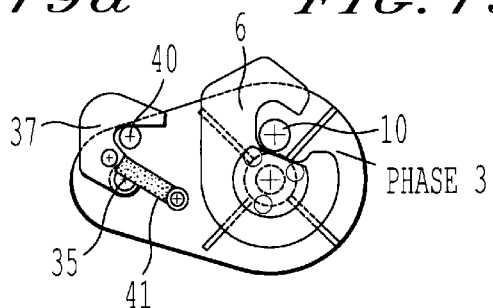

FIGS. 19a–19c break down the dynamics of the re-closure of the hook 6 and of the latch 37, corresponding to practically simultaneous re-closure of the doors 2 and 3, into three phases. Phase 1 (see FIG. 19a) corresponds to the position of the two olives 10 coming into contact with the hooks 6 and 7, the latter, together with the latches 36 and 37, being held open under the action of the springs 41. Phase 2 (see FIG. 19b) corresponds to the position where the olive 10 and the lower internal profiles 6b and 7b of the hooks 6 and 7 break contact. The rotation of the hooks 6 and 7 between phase 1 and phase 2 is such that it positions the springs 41 in a position that provides a torque for reclosing said hooks 6, 7 and latches 36, 37, to the point that they are brought into and kept in the passive locked position depicted in phase 3. It should be noted that, in the event of significant desynchronization of the doors 2 and 3, the olives 10 and 40 may be installed on retractable supports, of a design identical or similar to those described in FIG. 15.

These locking systems 4 may be applied to a cascade reverser equipped with sliding covers. The lock then synchronizes the simultaneous translational movement of the two covers, using exactly the same principle as the one set out here for the doors 2, 3.

We claim:

1. A thrust reverser for a turbojet having an outer cowling surrounding a gas ejection duct, said thrust reverser comprising a fixed structure including longitudinal spars delimiting passages between said spars in an annular section of said cowling, and a plurality of doors mounted to move between an inactive position occupied during forward thrust operation of said turbojet wherein said doors close off said passages and constitute part of said outer cowling, and a reverse thrust position wherein said doors at least partially close off said ejection duct and deflect the gaseous jet toward said passages, wherein there is provided, between two adjacent doors of said thrust reverser, a locking system allowing substantially simultaneous opening of said two doors, said locking system comprising, for each of said two doors, at least one hook mounted on said fixed structure so that it can pivot between a door locking position and an unlocked position, at least one olive secured to each of said two doors for engaging and pivoting said hooks during opening or closing movement of said doors, and a mechanical linkage device rotationally interconnecting the hooks of said two doors so as to prevent the unlocking of one door if the other door is closed.

2. A thrust reverser as claimed in claim 1, wherein each hook comprises a lower internal profile and an upper internal profile defining an olive housing, said internal profiles being configured in such a way that said lower internal profile is constantly in the path of the corresponding olive and wherein said upper internal profile can move out of said path, and in such a way that said olive exerts a locking torque when it presses against said lower internal profile and exerts an unlocking torque when it presses against said upper internal profile.

3. A thrust reverser as claimed in claim 1, wherein each hook is urged toward said unlocked position by resilient means.

4. A thrust reverser as claimed in claim 3, wherein the unlocked position of said hook is defined by a stop.

5. A thrust reverser as claimed in claim 1, wherein said olive is mounted on a retractable support so as to allow non-simultaneous closure of said two doors, said support being urged toward the active position of said olive by elastic means.

6. A thrust reverser as claimed in claim 1, wherein said hooks are mounted so that they pivot about pivot pins substantially parallel to the axis of rotation of the turbojet.

7. A thrust reverser as claimed in claim 6, wherein said mechanical linkage device consists of two intermeshed toothed sectors, each formed in the is peripheral wall of a respective one said hooks and centered on the pivot pin of the hook.

8. A thrust reverser as claimed in claim 6, wherein said mechanical linkage device comprises a link rod articulated at each end to a respective one of said hooks by means of a ball-type joint.

9. A thrust reverser as claimed in claim 6, wherein said mechanical linkage device comprises at least two link rods, each link rod being articulated in the manner of a ball joint to a respective hook by one of its ends and being connected slidingly to the other hook by the other end so that said link rods work mainly in tension.

10. A thrust reverser as claimed in claim 1, wherein each hook is mounted so that it can pivot about the axis of a transmission shaft substantially parallel to a pivot axis of the corresponding door.

11. A thrust reverser as claimed in claim 10, wherein said mechanical linkage device transmits torque between the transmission shafts of said hooks.

12. A thrust reverser as claimed in claim 11, wherein said shafts are linked by a linkage of the cardan type.

13. A thrust reverser as claimed in claim 1, wherein each hook is mounted so that it can pivot about the axis of a transmission shaft parallel to a pivot axis of the corresponding door, which shaft is rotationally linked to a transmission shaft of a control latch associated with the other door, said control latch being capable of being driven in rotation between a locked position and an unlocked position by a second olive with which the other door is equipped.

14. A thrust reverser as claimed in claim 13, wherein each hook comprises an upper internal profile preventing said hook from rotating when said olive is pressing against said profile as a consequence of premature opening of said door.

* * * * *

UNITED STATES PATENT AND TRADEMARK OFFICE
CERTIFICATE OF CORRECTION

PATENT NO. : 6,622,964 B2
DATED : September 23, 2003
INVENTOR(S) : Pascal G. Rouyer et al.

It is certified that error appears in the above-identified patent and that said Letters Patent is hereby corrected as shown below:

Column 9,
Line 24, please delete "is" before "peripheral".

Signed and Sealed this

Thirteenth Day of July, 2004

JON W. DUDAS
*Acting Director of the United States Patent and Trademark Office*